Figure 1C:
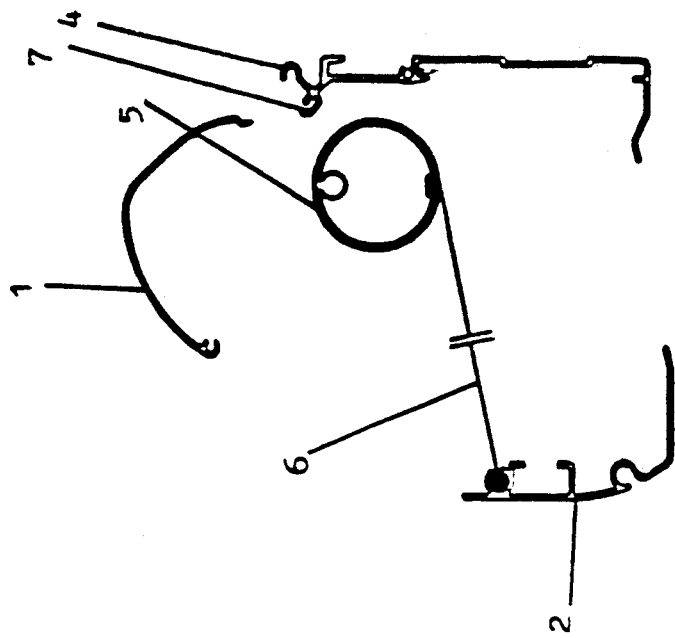

United States Patent [19]

Pozzi

[11] Patent Number: 5,285,837
[45] Date of Patent: Feb. 15, 1994

[54] AWNING

[75] Inventor: Carlo M. Pozzi, Ruvigliana, Switzerland

[73] Assignee: Fiamma S.P.A., Cardano Al Campo (VA), Italy

[21] Appl. No.: 896,225

[22] Filed: Jun. 10, 1992

[30] Foreign Application Priority Data

Sep. 27, 1991 [DE] Fed. Rep. of Germany ....... 4132362

[51] Int. Cl.$^5$ .............................................. E04F 10/00
[52] U.S. Cl. ...................................... 160/22; 160/66; 135/89
[58] Field of Search ................ 160/22, 66, 67, 68, 160/69, 70, 72, 323.1, 903, 23.1; 135/89

[56] References Cited

U.S. PATENT DOCUMENTS

| | | |
|---|---|---|
| 332,574 | 12/1885 | Vance .................. 160/323.1 X |
| 1,350,400 | 8/1920 | Yeomans ............... 160/323.1 |
| 1,764,367 | 2/1928 | Szymanski . | 
| 3,719,220 | 3/1973 | Small ................... 160/23.1 |
| 3,854,517 | 12/1974 | Nakamura ............. 160/323.1 |
| 4,171,013 | 10/1979 | Clark . |
| 4,399,857 | 8/1983 | Honma ................. 160/323.1 |
| 4,733,683 | 3/1988 | Pozz .................... 160/22 X |
| 4,762,162 | 8/1988 | Chochrek .............. 160/323.1 |
| 5,031,682 | 7/1991 | Tedeschi ............... 160/323.1 X |

FOREIGN PATENT DOCUMENTS 2836663 3/1980 Fed. Rep. of Germany .

*Primary Examiner*—Blair M. Johnson
*Attorney, Agent, or Firm*—Curtis, Morris & Safford

[57] ABSTRACT

An awning with a permanently installed housing for accommodation of an awning roll, rotatably supported on a shaft, comprising a shutter section adapted to be moved out of a run-out opening of the awning and containing the extensible end of the awning; housing side sections in which the shaft of the awning is held on each side, an actuating mechanism which is coupled to a winch engaging one end of the shaft, and at least one cover section, adapted to be swung open or removed, on the housing, the housing section opposite to the actuating mechanism comprising a mounting device in which the shaft of the awning roll can be inserted and from which it can be removed for the purpose of inserting the awning roll in and re-moving it from the housing, with the cover section opened, without removing the housing side section.

11 Claims, 3 Drawing Sheets

AWNING

The invention relates to awnings as defined in the introductory part of claim 1 which can be attached to buildings as well as to mobile homes, motor homes, etc.

Such awnings comprise a housing which is attached to a wall or to a vehicle of the type mentioned and comprises a run-out opening for the awning cloth. The awning cloth is extensible end is fastened in a shutter section which in its retracted position partly or completely closes the run-out opening. A number of housings with one or more cover sections that can be swung open have been proposed. These cover sections are moved into their flipped-up position during the pulling-out operation, and their purpose is to protect the unextended awning cloth against weathering.

As is known, despite the various measures for the closing and sealing of the housing of the awning, the awning cloth is frequently soiled in use or becomes unsightly under the action of the sun. Thus, it has to be removed for cleaning or replacement. However, the commonly used awnings incorporate no provision for the simple removal of the awning roll. Thus, while in principle the roll could be removed through the opening between flipped-up cover sections, it should be borne in mind that the awning is coupled to an actuating mechanism which engages it laterally and which provides the rotary motion of the shaft of the awning from the rotary motion of a winch crankshaft that is operated to move the awning in and out. Moreover, articulated arms are usually provided for spreading out the awning. Therefore, that the awning roll could not be removed from the housing without taking it almost completely apart in order to disengage the awning roll from its lateral anchorage and from the articulated arms.

The object of the invention is to provide an awning where the awning roll is readily removable.

This object is accomplished through the subject matter of claim 1.

Accordingly, a side section of the housing of the awning is constructed in a special manner, and a mounting device is provided which permits the end of the shaft of the awning roll that is opposed to the actuating mechanism to be mounted there and to be removed from the mounting device without disengaging the other end of the shaft from the actuating mechanism or removing the side section of the housing.

One possible embodiment of the mounting device is an inset into which the shaft end can be set spring-loaded. To this end, there may be provided on the inner surface of the side section of the housing a spring. This spring carries an inset into which the shaft end can be set against the force of said spring. For removal, the inset can be shifted, also against the force of the spring. Other spring-loaded mounting devices are feasible which permit the shaft to be held and removed on one side without the other end of the shaft being disengaged from the actuating mechanism. It is then possible to lift the shaft on one side in such a way that it can be disengaged without difficulty from the actuating mechanism on the other side.

In an alternative, preferred embodiment, the mounting device comprises a notch which extends all the way to the edge of the side section, and more particularly to the edge area over which the cover section, or one of the cover sections, is also located. After the other end of the shaft has been coupled to the actuating mechanism on the other side section of the housing, the respective end of the shaft of the awning roll can thus be readily inserted in that notch. When he awning roll is to be removed, the end of the shaft is simply pulled out of that notch and the roll can be raised over the edge of the housing so that the other shaft end can be disengaged from the actuating mechanism. The awning roll is then removed along with the shutter section in which its leading end is held. The cloth or the other parts with which the roll is provided can then be cleaned or replaced.

The need to remove the side sections of the housing before the awning roll is removed is thus obviated by particularly simple technical means.

The notch preferably extends diagonally upward and forward, and only one flip-up or detachable cover section is provided which extends from the shutter section over the upper portion of the housing. The shaft end which laterally projects from the housing side section with the notch carries a safety part of a diameter that is greater than the width of the slot, this part being somewhat spaced from the outer surface of the housing wall to permit the awning roll to be lifted out of the housing on one side.

Figure 1B:
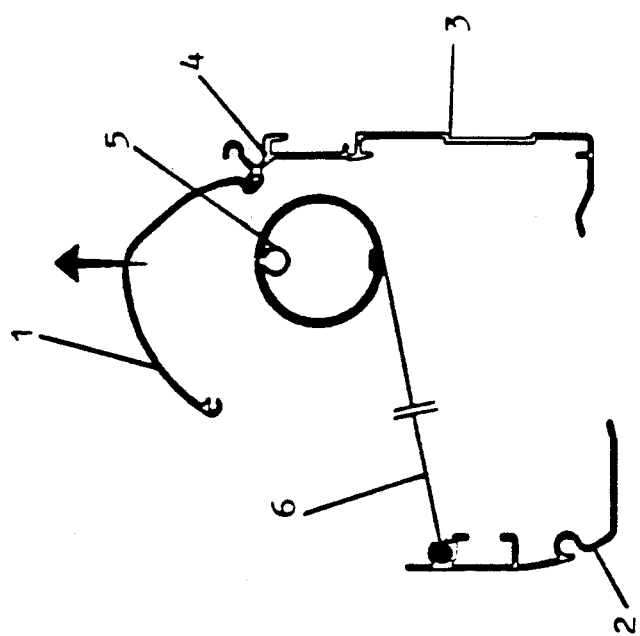
Figure 1A:
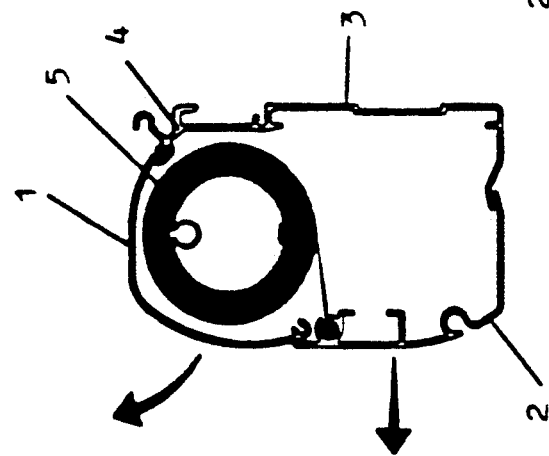
Figure 2C:
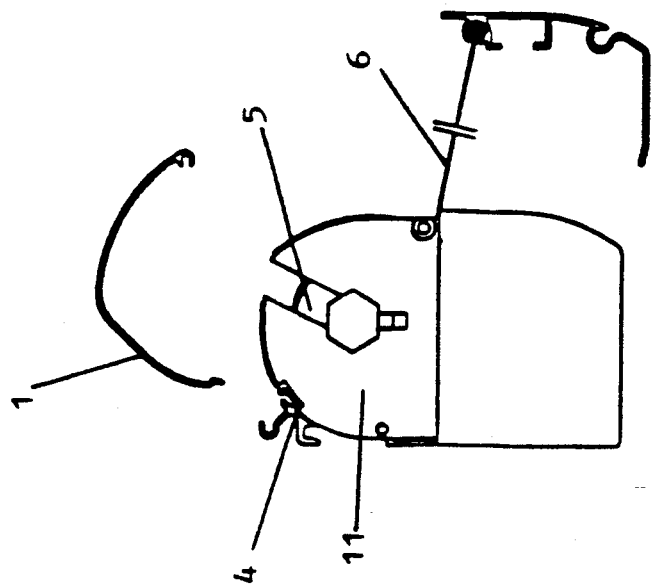
Figure 2B:
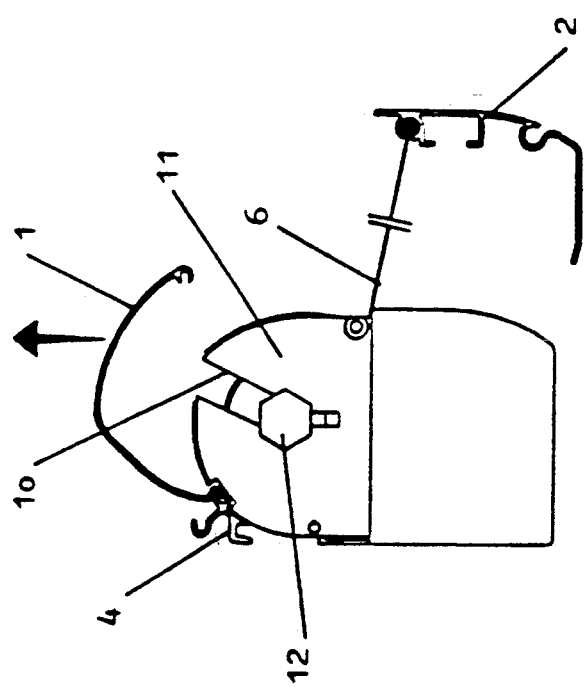
Figure 2A:
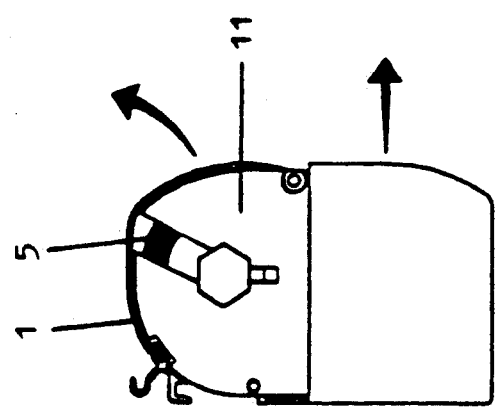
Figure 3A:
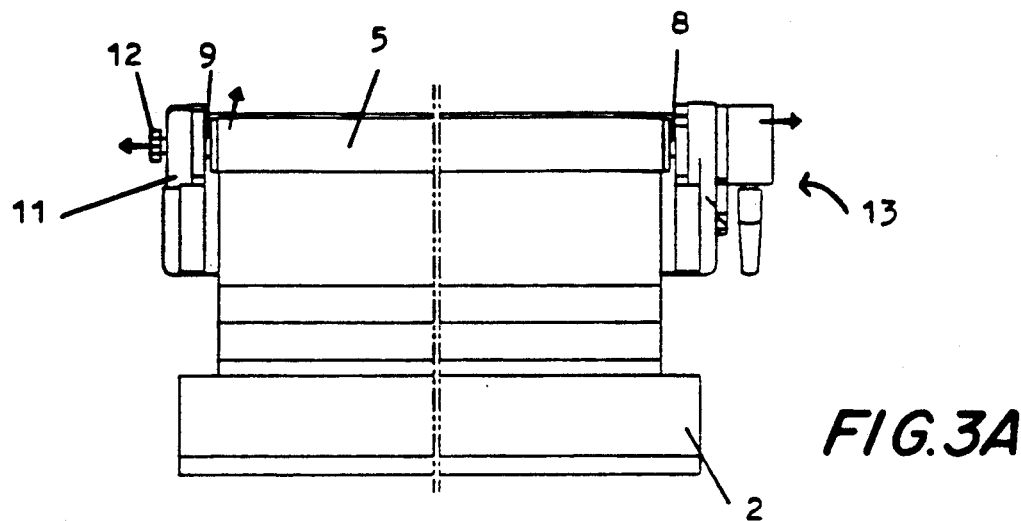
Figure 3B:
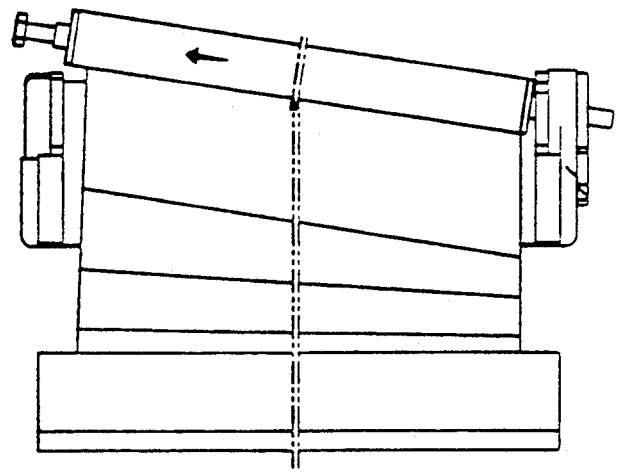
Figure 3C:
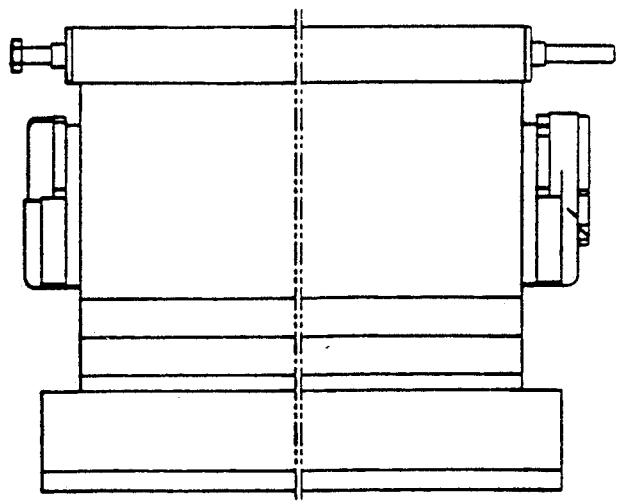

The invention will now be described in detail with reference to the drawings, where FIGS. 1A, 1B and 1C show one embodiment of the awning in accordance with the invention in three positions, viewed from one side;

FIGS. 2A, 2B and 2C show the awning of FIG. 1 in the three positions, viewed from the other side; and FIGS. 3A, 3B and 3C show the awning of FIG. 1, viewed from the front, in three further positions during the removal of the awning roll.

The awning shown diagrammatically in FIGS. 1 to 3 comprises a housing with a removable cover section 1, an extensible shutter section 2 and a fixed housing section 3 which by means of mounting hooks 4 is attached to a mobile home, for example. An awning roll 5 is accommodated in the housing, the leading end of the extensible awning cloth 6 being releasably clamped in the shutter section 2. The cover section 1 is adapted to be attached to the housing section 3 in a groove 7 therein on the side remote from the mounting hooks 4, the rear end of the cover section being provided with an appropriately shaped shoulder which engages said groove and whose shape is apparent from FIGS. 1 and 2.

The lower end of the cover section 1 extends in the swung-down position so far downward that the upper edge of the retracted shutter section 2 extends above the clamping point of the awning cloth over the lower end of the cover section. This lower or front end of cover section 1 comprises a mounting groove, apparent from the figures, for retention of the cover section in its closed position in which it is attached to the housing. When the parts are made of plastic, the grooves and shoulders can be readily manufactured by injection-molding methods, for example. If they are sufficiently elastic, snap joints can also be provided in this manner.

On the right side of the awning in FIG. 3, an actuating mechanism 13 is provided to which the right end 8 of the shaft of the awning is coupled for providing the rotation of the shaft from the rotation of the crankshaft, which extends perpendicularly downward and which is operated to move the awning in and out. Since the various actuating mechanisms are generally known and are not a subject of the present application, they are not explained in greater detail.

The other end 9 of the awning roll is set into a groovelike notch 10 in the side section 11 which in FIG. 3 is on the left. Onto the end of the shaft which projects from the caplike plastic side section 11 having the shape that is apparent from FIGS. 1 to 3 there is set a nut 12 that is spaced a sufficient distance from the outer surface of the side section 11 to permit the left side of the awning roll 5 to be lifted out of the housing over the edge of the side section 11, as shown in FIG. 3B.

The individual positions of the parts 1, 2 and 5 are apparent from the figures. In FIGS. 1A, 2A and 3A, the cover section 1 is joined to the housing and is in its closed position. When the awning roll 5 is to be removed, the shutter section 2 is first pulled out, and then the cover section 1 is raised and released from its moorings. (FIGS. 1B and 1C, and 2B and 2C.) As shown in FIG. 3, the left end of the awning roll 5 is then lifted out of the notch 10 and the awning roll is disengaged from the actuating mechanism 13 and pulled out toward the left in the direction of the arrow. The roll 5 with the shutter section 2 can then be removed.

Alternatively, a plurality of cover sections may be provided, including cover sections which cannot be removed but can only be swung open to an adequate degree. The notch 10 may also extend toward the front, for example; however, the design illustrated provides for both convenient removal and reliable insertion of the roll 5.

The joint between cover section 1 and shutter section 2 is not mandatory either; however, it does provide an advantageously simple solution with only two movable closure parts which permit good sealing of the housing. In place thereof, designs are possible in which the cloth is unwound from the upper end of the roll, for example, and several flip-up housing sections apply themselves against the shutter section when the awning is retracted.

All designs of cover and shutter sections lend themselves also to use with mounting devices which act from one side and into which the end of the shaft can be set with spring loading.

I claim:

1. An awning assembly comprising a housing having a side adapted to be permanently installed on a structure and a side including a run-out opening adapted to receive and permit removal of a movable shutter section; an awning roll rotatably supported on a shaft and accommodated within aid housing, said awning roll including an extensible end attached to said shutter section; and an actuating mechanism for winding up said awning roll; said housing further having an openable cover section and respective first and second side sections including means for holding respective first and second ends of said shaft of said awning roll in which at least one of said first and second ends of said shaft extends through the respective first and second side sections, said actuating mechanism being associated with the first side section and engaging said first end of said shaft, the second side section including shaft mounting means for permitting the second end of said shaft held by said second side section to be inserted and removed from said second side section a sufficient amount to allow insertion and removal of said awning roll from the housing, when said cover section is opened, without removing either housing side section.

2. An awning assembly as defined in claim 1, characterized in that said shaft mounting means includes an open notch located in said second section which is adapted to receive said second end of said shaft, said notch extending to an edge of the second side section adjacent to said cover section such that an end portion of said notch located thereat is exposed when said cover section is opened and is covered when said cover section is closed.

3. An awning assembly as defined in claim 1, characterized in that said openable cover section is swingingly openable a sufficient amount to permit said awning roll to be removed from the housing.

4. An awning assembly as defined in claim 1, characterized in that an upper edge of the retracted shutter section extends over a lower edge of the openable cover section.

5. An awning assembly as defined in claim 1, characterized in that said openable cover section is removable to permit said awning roll to be removed from the housing.

6. An awning assembly comprising a housing having a side adapted to be permanently installed on a structure and a side including a run-out opening adapted to receive and permit removal of a movable shutter section; an awning roll rotatably supported on a shaft and accommodated within aid housing, said awning roll including an extensible end attached to said shutter section; and an actuating mechanism for winding up said awning roll; said housing further having an openable cover section and respective first and second side sections including means for holding respective first and second ends of said shaft of said awning roll, said actuating mechanism being associated with the first side section and engaging said first end of said shaft, the second side section including shaft mounting means having an open notch with a predetermined width, said notch extending to an edge of the second side section adjacent to said cover section and being adapted to receive said second end of said shaft held by said second side section, said shaft mounting means for permitting said second end of said shaft to be inserted and removed from said second side section a sufficient amount to allow insertion and removal of said awning roll from the housing, when said cover section is opened, without removing either housing side section, said assembly further comprising a safety part having a diameter greater than the width of the notch, said safety part being secured to said second end of said shaft and projecting from said second side section.

7. An awning assembly as defined in claim 6, characterized in that the safety part is a nut set onto the second end of the shaft.

8. An awning assembly as defined in claim 6, characterized in that the safety part is located at a distance from an outer surface of the second housing side section sufficient to permit the awning roll to be lifted out of the side section so that the first end of said shaft engaged in said actuating mechanism can be pulled out of the actuating mechanism.

9. An awning assembly as defined in one of claims 2, 6, 7 and 8 characterized in that the notch is elongate and extends generally upwardly from a central region of the second housing side section.

10. An awning assembly as defined in one of claims 2, 6, 7 and 8 characterized in that the notch is elongate and extends diagonally upward towards the run-out side of the awning assembly housing.

11. An awning assembly as defined in one of claims 2, 6, 7 and 8 characterized in that said shutter section has an upper edge and said housing has an upper surface, said openable cover section having a portion extending from the upper edge of the shutter section over at least a portion of the upper surface of the housing.

* * * * *